(12) United States Patent
Brun

(10) Patent No.: US 8,285,541 B2
(45) Date of Patent: Oct. 9, 2012

(54) SYSTEM AND METHOD FOR HANDLING MULTIPLE LANGUAGES IN TEXT

(75) Inventor: Caroline Brun, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 86 days.

(21) Appl. No.: 12/854,543

(22) Filed: Aug. 11, 2010

(65) Prior Publication Data
US 2012/0035914 A1 Feb. 9, 2012

(51) Int. Cl.
*G06F 17/20* (2006.01)
*G06F 17/28* (2006.01)
*G06F 17/27* (2006.01)
*G10L 15/00* (2006.01)
*G10L 13/00* (2006.01)

(52) U.S. Cl. ............ 704/9; 704/1; 704/2; 704/4; 704/5; 715/256; 715/257; 715/264

(58) Field of Classification Search .................. 704/1, 2, 704/4, 5, 9; 715/256, 257, 264
See application file for complete search history.

(56) References Cited

U.S. PATENT DOCUMENTS

| | | | |
|---|---|---|---|
| 5,062,143 A | 10/1991 | Schmitt | |
| 5,913,185 A * | 6/1999 | Martino et al. | 704/8 |
| 6,009,382 A * | 12/1999 | Martino et al. | 704/1 |
| 6,047,251 A * | 4/2000 | Pon et al. | 704/1 |
| 6,182,026 B1 | 1/2001 | Tillmann et al. | |
| 6,272,456 B1 * | 8/2001 | de Campos | 704/8 |
| 6,292,772 B1 * | 9/2001 | Kantrowitz | 704/9 |
| 6,415,250 B1 * | 7/2002 | van den Akker | 704/9 |
| 7,058,567 B2 | 6/2006 | Ait-Mokhtar et al. | |
| 7,343,556 B2 | 3/2008 | Dahl | |
| 7,412,374 B1 * | 8/2008 | Seiler et al. | 704/8 |
| 7,552,045 B2 * | 6/2009 | Barliga et al. | 704/8 |
| 7,687,408 B2 * | 3/2010 | Abatchev et al. | 438/751 |
| 7,689,409 B2 * | 3/2010 | Heinecke | 704/9 |
| 7,979,266 B2 * | 7/2011 | Alpha | 704/8 |
| 8,027,832 B2 * | 9/2011 | Ramsey et al. | 704/9 |
| 2004/0024581 A1 | 2/2004 | Koehn et al. | |
| 2004/0030551 A1 | 2/2004 | Marcu et al. | |
| 2004/0158454 A1 | 8/2004 | Polanyi et al. | |

(Continued)

OTHER PUBLICATIONS

Bruno Martins and Mário J. Silva. 2005. Language identification in web pages. In Proceedings of the 2005 ACM symposium on Applied computing (SAC '05), Lorie M. Liebrock (Ed.). ACM, New York, NY, USA, 764-768.*

(Continued)

*Primary Examiner* — Paras D Shah
(74) *Attorney, Agent, or Firm* — Fay Sharpe LLP

(57) ABSTRACT

A system and method for processing text are disclosed. The method includes receiving text to be processed. A main language of the text is identified. At least one unknown sequence in the text is identified, each unknown sequence comprising at least one word that is unknown in the main language. For a secondary language, for each of the at least one unknown sequence, the method includes determining whether the unknown sequence includes a first word recognized in the secondary language and, if so, identifying a sequence of words in the secondary language which includes at least the first word. The identifying of the sequence of words in the secondary language includes applying an algorithm for determining whether the sequence of words in the secondary language is expandable beyond the first word to include adjacent words. The text is labeled based on the identified sequences of words in the secondary language.

26 Claims, 3 Drawing Sheets

U.S. PATENT DOCUMENTS

| | | | |
|---|---|---|---|
| 2006/0111893 | A1 | 5/2006 | Florian et al. |
| 2006/0190241 | A1 | 8/2006 | Goutte et al. |
| 2007/0150257 | A1 | 6/2007 | Cancedda et al. |
| 2007/0179776 | A1 | 8/2007 | Segond et al. |
| 2007/0265825 | A1 | 11/2007 | Cancedda et al. |
| 2008/0071518 | A1 | 3/2008 | Narayanan et al. |
| 2008/0103757 | A1* | 5/2008 | Washizawa et al. ............... 704/2 |
| 2008/0147380 | A1* | 6/2008 | Barliga et al. .................... 704/9 |
| 2008/0300857 | A1 | 12/2008 | Barbaiani et al. |
| 2009/0204596 | A1 | 8/2009 | Brun et al. |
| 2009/0265304 | A1 | 10/2009 | Ait-Mokhtar et al. |
| 2009/0307584 | A1* | 12/2009 | Davidson et al. ............. 715/257 |
| 2009/0326918 | A1* | 12/2009 | Georgiev et al. .................. 704/8 |
| 2010/0125447 | A1* | 5/2010 | Goswami .......................... 704/8 |
| 2010/0312545 | A1* | 12/2010 | Sites ................................. 704/8 |

OTHER PUBLICATIONS

Marcadet, J. C. / Fischer, V. / Waast-Richard, C. (2005): "A transformation-based learning approach to language identification for mixed-lingual text-to-speech synthesis", In INTERSPEECH-2005, 2249-2252.*

Beesley, et al. "Finite State Morphology," CSLI Studies in Computational Linguistics, 2003 (Abstract).

G. G. Bes. "La phrase verbale noyau on français," Recherches sur le français parlé, 15:273-358, 1999 (Abstract).

Chanod et al., "Tagging French text: tagset, dedicated lexicons and guesser," Proc. From Texts to Tags: Issues in Multilingual Language Analysis, EACL SIGDAT workshop. Dublin (1995).

Grefenstette, "Comparing Two Language Identification Schemes," Proc. 3rd Intern'l Conf. on the Statistical Analysis of Textual Data (JADT'95), Rome, Italy (1995).

Aït-Mokhtar, et al.,"Incremental Finite-State Parsing," Proceedings of Applied Natural Language Processing, Washington, Apr. 1997.

Aït-Mokhtar, et al., "Subject and Object Dependency Extraction Using Finite-State Transducers," Proceedings ACL'97 Workshop on Information Extraction and the Building of Lexical Semantic Resources for NLP Applications, Madrid, Jul. 1997.

Aït-Mokhtar, et al., "Robustness beyond Shallowness: Incremental Dependency Parsing," Special issue of NLE journal (2002).

P. Blache. "Property grammars: A fully constraint-based theory," In constrain Soling and Language Processing, 2005.

U.S. Appl. No. 12/690,504, Stymne, et al.

U.S. Appl. No. 12/784,040, Dymetman, et al.

U.S. Appl. No. 12/814,657, Hanneman, et al.

* cited by examiner

US 8,285,541 B2

SYSTEM AND METHOD FOR HANDLING MULTIPLE LANGUAGES IN TEXT

BACKGROUND

The exemplary embodiment relates to natural language processing of text. It finds particular application in connection with processing of mixed language text and will be described with particular reference thereto.

It is quite common for a text document, written in a given language, to include some phrases, sentences, or paragraphs which are written in another language. This is particularly the case in informal communication media, such as blogs, social networks and the like, but can occur in a wide range of document types. Mixed language text, as used herein, is text which follows the syntax and grammar of a first (main) language but includes, within it, one or more sequences of words in one or more secondary languages. As examples of mixed language text consider the following, where the secondary language text is shown in bold for ease of illustration:

1. A blog comment mixing French and some English, extracted from "Overblog", a French site dedicated to blogs and discussion forums:
   Bienvenue à tous dans les Charts du Vendredi, avec le classement made in Japan des meilleures ventes de jeux et de consoles sur le sol nippon pour la période du 15 au 21 février derniers . . . [ ] La PSP n'est qu'un brin au dessus de sa grande sœur aussi, tandis que la DS tient toujours tout le monde a bonne distance, of course . . . .

2. In a scientific article mixing Spanish, English and Quechua: Maldesarrollo: entre el "American way of life" y el "sumak kawsay".

3. In the reference section of an English scientific article, a French reference:
[1] K. R. Beesley and L. Karttunen. Finite State Morphology. CSLI Studies in Computational Linguistics, 2003.
[2] G. G. Bes. La phrase verbale noyau en français. Recherches sur le français parlé, 15:273-358, 1999.

As can be seen from these examples, in some cases, the secondary language sequences are delimited, e.g., by structural delimiters, such as quotes as in Example 2, whereas in other cases, such as Examples 1 and 3, there is no indication that these are not ordinary main language words. A reader fluent in the main language is usually capable of recognizing that these are probably words of a different language, and understand their use in the sentence, even if he is unable to translate them exactly. However, computer-implemented systems for processing text, e.g., for opinion mining, machine translation, information extraction, grammar and spelling checkers, and the like, are unable to process them effectively, for example, to assign parts of speech or perform syntactic analysis of the sentence.

INCORPORATION BY REFERENCE

The following references, the disclosures of which are incorporated herein by reference in their entireties, are mentioned:

U.S. Pat. No. 7,058,567, issued Jun. 6, 2006, entitled NATURAL LANGUAGE PARSER, by Salah Aït-Mokhtar, et al., discloses a parser for syntactically analyzing an input text string. The parser applies a plurality of rules which describe syntactic properties of the language of the input text string.

U.S. Pat. No. 7,343,556, issued Mar. 11, 2008, entitled TECHNIQUE FOR PROCESSING AND GENERATING MESSAGES IN MULTIPLE LANGUAGES, by Andreas D. Dahl, discloses a method for associating default language keys to a given message and foreign language keys to portions of the message containing characters that cannot be translated with the default codepage.

U.S. Pat. No. 5,062,143, issued Oct. 29, 1991, entitled TRIGRAM-BASED METHOD OF LANGUAGE IDENTIFICATION, by John C. Schmitt, discloses a mechanism for examining a body of text and identifying its language. Successive trigrams, into which the body of text is parsed, are compared with a library of sets of trigrams. For a respective language-specific key set of trigrams, if the ratio of the number of trigrams in the text, for which a match in the key set has been found, to the total number of trigrams in the text is at least equal to a prescribed value, then the text is identified as being possibly written in the language associated with that respective key set.

U.S. Pub. No. 2006/0111893, published May 25, 2006, entitled DISPLAY OF RESULTS OF CROSS LANGUAGE SEARCH, by Radu Florian, et al., discloses a method, apparatus, and computer instructions for displaying search results. The method includes receiving a query in a first language. A document in a second language is identified in which the document contains a word matching a query word in the query. A snippet in the document containing the word is selected and translated into the first language.

U.S. Pub. No. 2008/0071518, published Mar. 20, 2008, entitled COMMUNICATION SYSTEM USING MIXED TRANSLATING WHILE IN MULTILINGUAL COMMUNICATION, by Shrikanth Narayanan, et al., discloses a method for translation between a source language and a target language. Language items are divided, with secondary source language items or named entities being identified. Those entities are translated in a different way. For example, they may be copied into the target language, or translated in a special way that is based on their meaning, e.g., into a term that has a more descriptive meaning in the target language.

Methods for opinion mining are disclosed, for example, in U.S. Pub. No. 2004/0158454, published Aug. 12, 2004, entitled SYSTEM AND METHOD FOR DYNAMICALLY DETERMINING THE ATTITUDE OF AN AUTHOR OF A NATURAL LANGUAGE DOCUMENT, by Livia Polanyi, et al., and U.S. Pub. No. 2009/0265304, published Oct. 22, 2009, entitled METHOD AND SYSTEM FOR RETRIEVING STATEMENTS OF INFORMATION SOURCES AND ASSOCIATING A FACTUALITY ASSESSMENT TO THE STATEMENTS, by Salah Aït-Mokhtar, et al.

Phrase based machine translation systems and methods for generating and using them are disclosed, for example, in U.S. Pat. No. 6,182,026 entitled METHOD AND DEVICE FOR TRANSLATING A SOURCE TEXT INTO A TARGET USING MODELING AND DYNAMIC PROGRAMMING, by Tillmann, et al.; U.S. Pub. No. 2004/0024581, published Feb. 5, 2004, entitled STATISTICAL MACHINE TRANSLATION, by Koehn, et al.; U.S. Pub. No. 2004/0030551, published Feb. 12, 2004, entitled PHRASE TO PHRASE JOINT PROBABILITY MODEL FOR STATISTICAL MACHINE TRANSLATION, by Marcu, et al.; U.S. Pub. No. 2008/0300857, published Dec. 4, 2008, entitled METHOD FOR ALIGNING SENTENCES AT THE WORD LEVEL ENFORCING SELECTIVE CONTIGUITY CONSTRAINTS, by Madalina Barbaiani, et al.; U.S. Pub. No. 2006/0190241, published Aug. 24, 2006, entitled APPARATUS AND METHODS FOR ALIGNING WORDS IN BILINGUAL SENTENCES, by Cyril Goutte, et al.; U.S. Pub. No. 2007/0150257, published Jun. 28, 2007, entitled MACHINE TRANSLATION USING NON-CONTIGUOUS FRAGMENTS OF TEXT, by Nicola Cancedda, et al.; U.S.

Pub. No. 2007/0265825, published Nov. 15, 2007, entitled MACHINE TRANSLATION USING ELASTIC CHUNKS, by Nicola Cancedda, et al.; U.S. application Ser. No. 12/690,504, filed on Jan. 1, 2010, entitled STATISTICAL MACHINE TRANSLATION SYSTEM AND METHOD FOR TRANSLATION OF TEXT INTO LANGUAGES WHICH PRODUCE CLOSED COMPOUND WORDS, by Sara Stymne, et al.; application Ser. No. 12/784,040, filed May 20, 2010, entitled DYNAMIC BI-PHRASES FOR STATISTICAL MACHINE TRANSLATION, by Marc Dymetman, et al., and U.S. application Ser. No. 12/814,657, filed Jun. 14, 2010, entitled WORD ALIGNMENT METHOD AND SYSTEM FOR IMPROVED VOCABULARY COVERAGE IN STATISTICAL MACHINE TRANSLATION, by Gregory Hanneman, et al.

BRIEF DESCRIPTION

In accordance with one aspect of the exemplary embodiment, a method for processing text includes receiving text to be processed and identifying a main language of the text. At least one unknown sequence in the text is identified, each unknown sequence comprising at least one word that is unknown in the main language. For a secondary language, for each of the at least one unknown sequence, the method includes determining whether the unknown sequence includes a first word recognized in the secondary language and, if so, identifying a sequence of words in the secondary language which includes at least the first word, the identifying of the sequence of words in the secondary language including determining whether the sequence of words in the secondary language should be expanded beyond the first word to include adjacent words. The text is labeled based on the identified sequences of words in the secondary language.

In another aspect, a system for processing text, includes an input for receiving text to be processed, a language guesser for identifying a main language of the text, a recognizing component which identifies at least one unrecognized sequence in the text, each unrecognized sequence comprising at least one word that is unrecognized in the main language, a sequence extraction component which, for each of a plurality of secondary languages in a determined order of priority, determines whether at least one of the unrecognized sequences includes a first word recognized in a respective secondary language and, if so, identifies a sequence of words in the respective secondary language which includes at least the first word by providing rules for expanding the sequence beyond the first word with additional words that are determined to be in the respective secondary language. An unrecognized sequence which has been determined to be in a secondary language with a higher priority is not considered by the sequence extraction component for a secondary language with a lower priority. A processor implements at least one of the language guesser, recognizing component, and the sequence extraction component.

In another aspect, a method for identifying word sequences in at least one secondary language within text in a main language, includes identifying at least one unknown sequence in the text, each unknown sequence including at least one word that is unknown in the main language. For each of a plurality of secondary languages in a determined order of priority, the method includes determining whether at least one of the at least one unknown sequences includes a first word recognized in a respective one of the plurality of secondary languages and, if so, implementing an algorithm for identifying a sequence of words in the respective secondary language which includes at least the first word by extending the sequence beyond the first word with additional words that are determined to be in the respective secondary language. An unknown sequence which has been determined to be in a sequence of words in a respective secondary language with a higher priority is not considered by the sequence extraction for a secondary language with a lower priority. The identified sequences are labeled, based on the respective secondary language.

DETAILED DESCRIPTION

Aspects of the exemplary embodiment relate to a system and method for detecting sequences of words belonging to a secondary language that are within a main language text. The method allows labeling the sequence of words to indicate the secondary language and associating parts of speech with the text containing the sequence. This can be achieved without requiring the translation of the secondary language sequence.

The main language of an input text document is generally the natural language in which the majority of words are recognized and additionally, generally follows the grammar rules associated with that language. Input text in a main language may include one or more sequences in one or more secondary languages. Each secondary language can be any natural language other than the main language. Each sequence in a secondary language can include one or more words in that language. One or more of the words of a sequence which are recognized in that secondary language are words which are not recognized in the main language. By "recognized" or "known" it is meant that the word or words is automatically attributable to that language, e.g., by virtue of being represented in a respective lexicon for that language. Unknown/unrecognized words are those which are not represented in a respective lexicon for that language.

The exemplary method and system find application in a variety of language-dependent applications, such as information extraction, machine translation, grammar and spelling checkers, and the like. The information associated with the text in the course of the method can enable the triggering of adapted processing components and/or disable non-adapted components for given parts of the text. By way of example, the benefits of the method are illustrated using the Xerox Independent Parser (XIP) parsing tool, although the system and method are not limited to such applications.

A "document" is used herein to mean an electronic (e.g., digital) recording of information, or part thereof. A document generally includes text, in one or more natural languages, such as French, English, and the like, and may comprise an entire document or an extract thereof. The text is generally in a form which can be extracted (e.g., directly or by OCR processing) and processed using natural language processing (NLP) techniques. A document may be as short as a sentence or may be several paragraphs or pages in length, or longer, although shorter text strings, such as clauses and phrases, are also contemplated.

Figure 1:
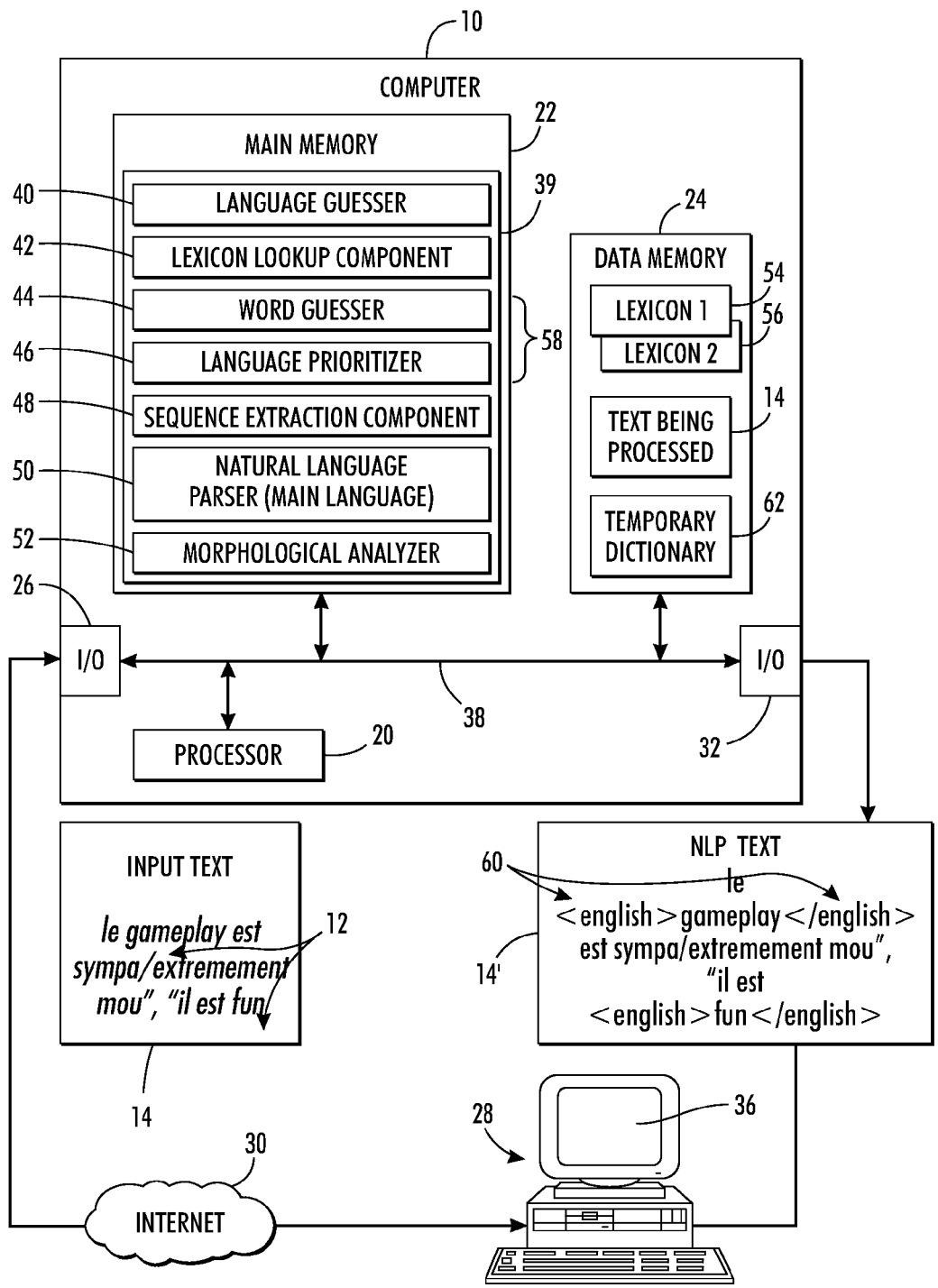
FIG. 1 is a functional block diagram illustrating a system for processing text predominantly in a main language to identify sequences of words in a secondary language or languages in accordance with one aspect of the exemplary embodiment.

FIG. 1 is a functional block diagram of a computer-implemented system 10 for detecting and labeling secondary language text sequences 12 of an input digital text document 14. In general, the input text can include sentences in a main natural language, such as English or French, which potentially includes one or more secondary language text sequences 12, each sequence comprising one or more words recognized in a respective secondary language, which is a different language from the main language, having a respective syntax and grammar as well as a respective lexicon.

The digital document 14 can be in any format suitable for processing by the system, such as a Word document, PDF, or markup language document, such as one in HTML (Hypertext Markup Language), extended markup language (XML) SGML (Standardized General Markup Language), or the like, and may be, for example, a newspaper article, research article, thesis, research proposal, web page, or the like which is to be or has been made accessible to searchers, e.g., via a journal website, web address, company database, or the like.

The illustrated computer system 10 includes a processor 20, which controls the overall operation of the computer system 10 by execution of processing instructions which are stored in main memory 22 connected to the processor 20. A digital document 14 undergoing processing by the system 10 may be stored in data memory 24. Computer system 10 also includes a network interface 26 for receiving a digital document 14 from a document source 28, such as a personal computer, web server, portable memory storage device, scanner, or the like, e.g., via a wired or wireless connection 30. Alternatively, document 14 may be created within the system.

An output interface 32 outputs a document 14' which has been processed by the system 10, and which may include, within the document itself, or in a separate file, labels for the secondary language sequences which have been identified. The labels may be in the form or metadata, hypertext, or the like. The interface 32, which may be the same as or separate from interface 26, may output the processed document 14' to a graphical user interface (GUI) which includes a display 36 for displaying a representation of the processed text to a user. The GUI may be hosted by a computing device, here shown as personal computer 28, for displaying the processed text. In other embodiments, the processed text 14' may be output to a memory storage device (not shown) for post processing, querying, or the like. The various components 20, 22, 24, 26, 32 of the computer system 10 may be connected by a bus 38.

Figure 2:
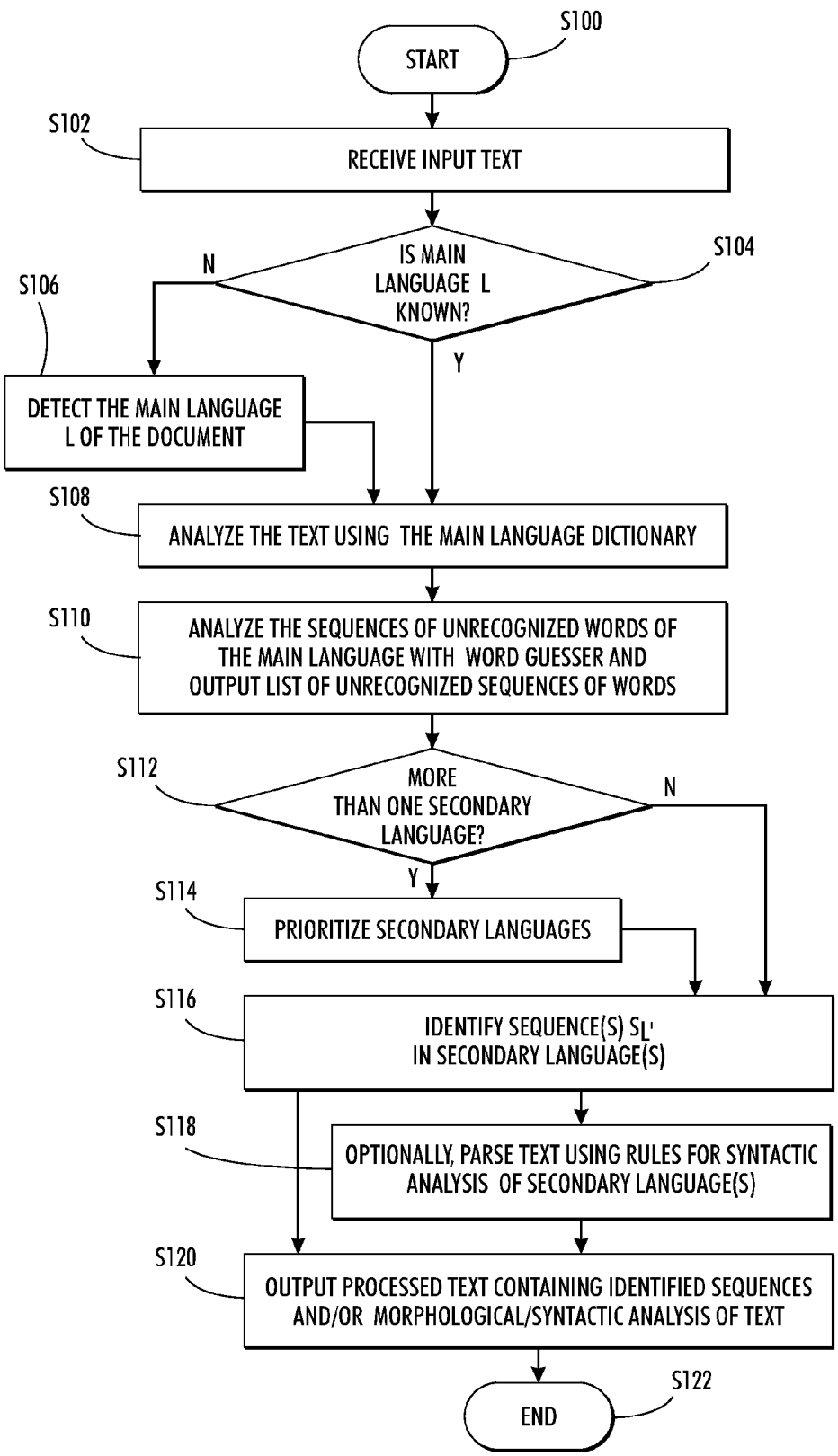
FIG. 2 illustrates a method for processing text in accordance with another aspect of the exemplary embodiment.
Figure 3:
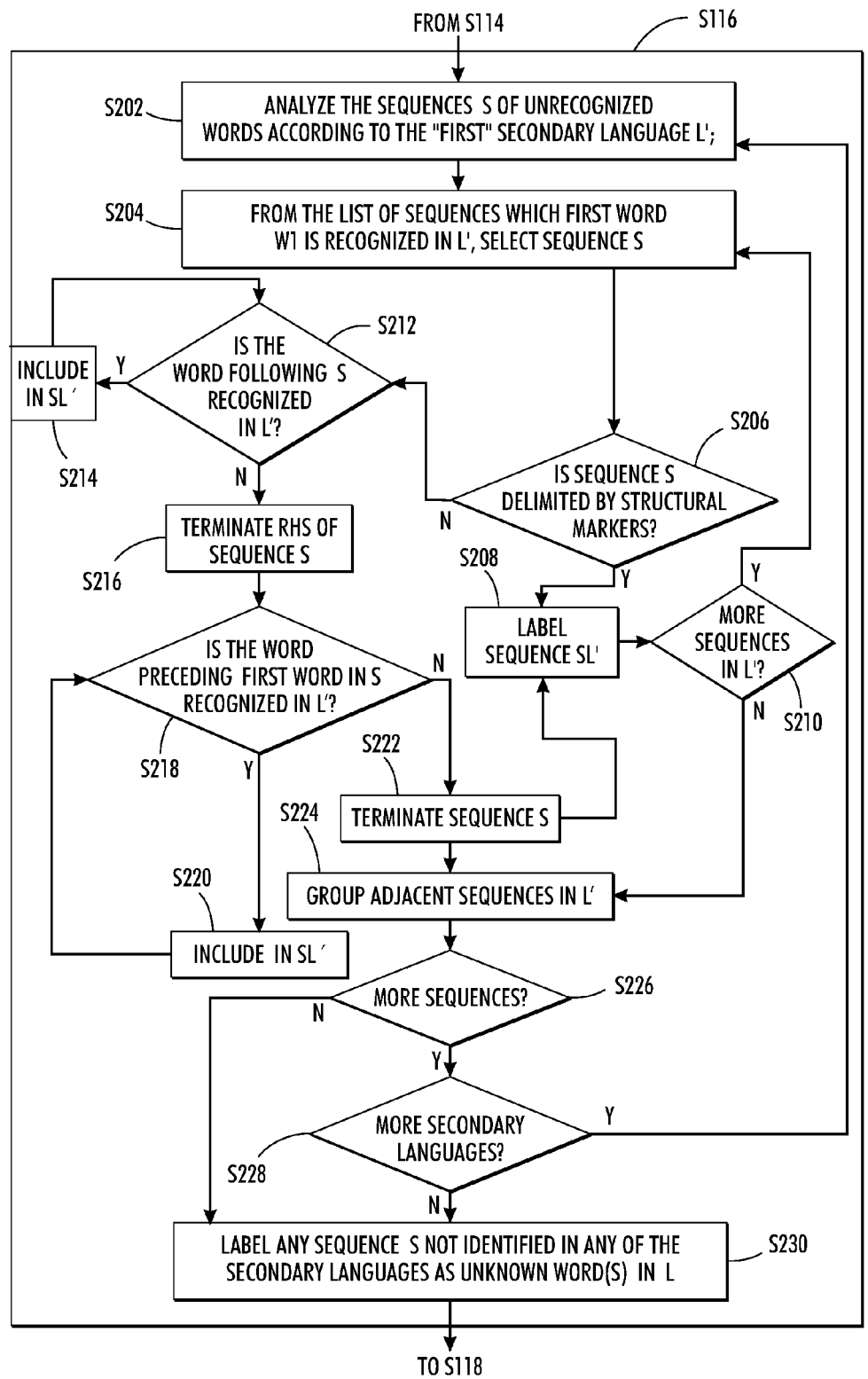
FIG. 3 illustrates one embodiment of part of the method of FIG. 2.

The processor 20 executes instructions 39 stored in memory 22 for performing the method outlined in FIGS. 2 and 3. In particular, memory 22 stores various software processing components implemented by the processor 20, including a language guesser 40, a lookup component 42, a word guesser 44, a language prioritizer 46, a sequence extraction component 48, a natural language parser 50 and optionally one or more morphological analyzers for each of a plurality of secondary languages. However, it is to be appreciated that while separate software components are shown, these may be combined or split or interact with remotely located software components in performance of the method. Processing components 40, 42, 44, 46, 48, 50, 52 may alternatively be in the form of hardware. In some embodiments, one or more of these components may be omitted.

Briefly, the input document 14 is tokenized by the system 10, e.g., by the parser 50 or by a separate tokenizer. Tokenizing decomposes the text into a sequence of tokens, each token including a word or punctuation.

The language guesser 40 operates at the document level and identifies a main language for the text as a whole, in cases where the main language is unspecified. In general, language guessers are tools identifying the language of a text, based on statistical methods (trigrams), or on the presence and/or frequencies of certain words, word endings, and the like. The language guesser may be resident in memory of the computer 10 or accessible thereto. For descriptions of exemplary language guessers 40, see, e.g., Jean-Pierre Chanod and Pasi Tapanainen, "Tagging French text: tagset, dedicated lexicons and guesser," Proc. From Texts To Tags: Issues In Multilingual Language Analysis, EACL SIGDAT workshop. Dublin (1995); and Gregory Grefenstette, "Comparing Two Language Identification Schemes," Proc. 3rd Intern'l Conf. on the Statistical Analysis of Textual Data (JADT '95), Rome, Italy (1995), which compares two standard technologies (trigram versus small word) to perform the task; and above-mentioned U.S. Pat. No. 5,062,143). Using such tool, a sequence like: "Og Lykken vendes kan om til Nød" is guessed as Danish, or "已把整盒「看圖識字」"已把整盒「看圖識字」is guessed as Chinese.

One currently available language guesser 40 which can be used for guessing one of 47 languages is accessible at http://legacy.xrce.xerox.com/competencies/content-analysis/tools/guesser.en.html. Such a language guesser could be extended to cover additional languages or reduced to exclude languages not expected to be found in the input text.

Such tools 40 have been developed for assigning a language to an entire document 14 and, in general, they are not suited to application to subsequences of the text to identify one or more secondary languages. While such language guessers may be useful for guessing the language of longer unknown sequences, such as entire sentences, they generally function best with a minimum length of a sequence of words (e.g., 7-9 words). Moreover they are not adapted for detecting the boundaries of sequences of words in secondary languages.

The exemplary sequence extraction component 48 employs a detection algorithm which identifies sequences of text in a secondary language or languages and may also take advantage of the presence of delimiters, such as structural marks, e.g., quotation marks, or various forms of emphasizing characters, such as italic, bold, and the like that indicate(s) a specific sequence of words within the discourse.

A main language lexicon 54 and one or more secondary language lexicons 56 may be resident in the computer system 10, such as in data memory 24, or accessible to the system, e.g., via a web link. The lexicons may be dictionaries or a lexical database, such as WordNet™. The exemplary main language lexicon 54 provides parts of speech for words in the main language, enabling morphological analysis of the main language text. The secondary language lexicon 56 may also provide parts of speech which are applicable to the secondary language or may be a simple listing of words in the secondary language.

The lookup component 42 and word guesser 44 serve as a recognition component 56 for identifying sequences of one or more words which are not recognized in the main language. The lookup component 42 accesses the main language lexicon 54 to determine whether the words are recognized in the main language. A morphological analysis of the word may be output by the lookup component 42 or parser, based on the information in the lexicon. Any words which are not represented in the finite state lexicon 54 are considered as being unrecognized words in the main language. By "represented," it is meant that a word or words are present in the lexicon in some form, such as their surface form, as used in the text, their root form, such as a singular form of a plural word or infinitive form of a verb. Unrecognized words are then processed by the sequence extraction component 48. For any word which is not in the main language, the word guesser 44 may guess what part of speech should be associated with it. The word guesser 44 operates at the word level to provide morphological interpretation of unrecognized words. In the exemplary embodiment, the word guesser 44 provides morphological analysis for words in the text that are not represented in the main language lexicon 54. Unrecognized sequences in the text, comprising one or more words that are not recognized in the main language, may each be labeled as unrecognized sequences by the word guesser 44 (or lookup component) for processing by the sequence extraction component 48. In some embodiments, the word guesser may be combined with the lookup component 42.

The word guesser 44 may be in the form of automata that propose morphological interpretation for words not recognized in a given lexicon, such as lexicon 54. It is to be appreciated that unrecognized words (words not found in the main language lexicon 54) can be proper nouns, misspelled words, words emerging because of lexical creation or words belonging to another language. The word guesser 44 provides an analysis of these words, for a given language. The morphological interpretation provided by word guesser 44 may include part of speech, and, depending on the part of speech as well as on the word ending, in some cases, gender and number, person, tense, and mood. For example, in the main language of English, analyzing misspelled words such as necesary or wunted (for wanted) may provide the following morphological analysis (listed for each, the word, its root form, and morphology, or morphologies, where ambiguous):

| | | |
|---|---|---|
| necesary | necesary | Guess+Sg+NADJ |
| wunted | wunt | Guess+Verb+PastBoth+123SP+VPAP |
| wunted | wunt | Guess+Verb+PastBoth+123SP+VPAST |
| wunted | wunted | Guess+Adj+VPap+ADJPAP |

Thus, necessary is interpreted as a guessed singular noun or adjective, and wunted as a guessed past verb or past participle adjective in the English language. In the exemplary embodiment, these words would be classed as unrecognized in the main language and processed by the exemplary sequence extraction component 48. Word guessers may be provided for each of the languages to be processed by the system as main languages.

During the subsequent processing of word sequences which are unknown in the main language, the lookup component 42 and/or a separate morphological analyzer 52, may also assign parts of speech to words that are recognized in a secondary language, using the appropriate finite state lexicon(s) 56 for each of a set of secondary languages. See, for example, the tools available at http://legacy.xrce.xerox.com/competencies/content-analysis/demos/german.en.html.

Prior to processing with the sequence extraction component, the language prioritizer 46 establishes a priority for processing the text by the sequence extraction component 48, which is based on the main language. The prioritizer 46 may apply a heuristic to prioritize the secondary languages to be tested. In many cases, when not the main language, English is the language most used as a secondary language. For example, one poll shows that most popular secondary languages in Europe are, in order, English, French, German, Spanish and Russian. Such an ordering strategy may be used by the prioritizer for ordering the processing of the unknown sequences to identify sequences in secondary languages in the document.

Alternatively or additionally, the ordering information can be obtained statistically on large corpora, such as through analysis of other documents in a corpus from which the document was selected, or from larger corpora of documents in the same main language. The language prioritizer then establishes an order for the most common secondary languages found in the particular corpus or general corpus to be processed by the extraction component 48, based on their frequency of occurrence. The language prioritizer 46 may also establish a maximum number of secondary languages which are to be evaluated by the extraction component 48.

For example, a word guesser, such as word guesser 44, is used to extract a list of unrecognized words from a corpus in a given language. The list of unrecognized words is reanalyzed with several language dictionaries, and the frequencies of the recognized words counted. On the basis of the results, a heuristic can then be defined for the prioritizer 46 to implement. As illustration, this test was performed on the French Hanneman Corpora, the Spanish journal *el País* (for the year 1996), and on the *British National Corpus* (BNC). Table 1 summarizes the results obtained:

TABLE 1

| Frequencies Of Unrecognized Words Recognized In A Secondary Language | | | |
|---|---|---|---|
| Corpus | Hanneman | El País | BNC |
| Number of words in corpus | 34,488,908 | 596,090 | 6,229,308 |
| Number of unknown words | 29,557 | 9155 | 321,058 |
| Proportion of unknown words recognized in English | 20% | 22% | — |
| Proportion of unknown words recognized in French | — | 10% | 6% |
| Proportion of unknown words recognized in German | 10% | 10% | 4% |
| Proportion of unknown Words recognized in Spanish | 8% | — | 3% |
| Proportion of unknown words recognized in Italian | 2.5% | 4% | 2.5% |
| Proportion of unknown words recognized in Portuguese | 1.8 | 7% | 1.4% |
| ... | ... | ... | ... |

From these results, the following prioritization strategy may be applied by the prioritizer 46:

1. For French as the main language, try first to detect unknown word sequences in English, then in German, then Spanish, then Italian . . . .
2. For Spanish as the main language, the corresponding order would be English, French/German (in either order), Portuguese, and Italian.
3. For English (in particular, British English) as the main language, the corresponding order would be French, German, Spanish, . . . .

Moreover, the results, such as those in Table 1, can be used to establish a threshold, below which the detection algorithm applied by the sequence extraction component 48 is not to be applied for a given language. For example, if the threshold is set at 2% coverage of the unknown words, then based on Table 1, Portuguese is not considered where French is the main language, but is considered when Spanish is the main language. For French as the main language, the secondary languages tested are therefore English, then German, and finally Spanish, but Italian and Portuguese are excluded.

As will be appreciated, not all the secondary languages may be applied for any given text. For example, in a text with French as the main language, if all unknown sequences are recognized in English, they are not processed for German, Spanish, or Italian. As will also be appreciated, corpora more specific to the application than those illustrated in TABLE 1 may be considered for establishing the priority heuristic. Nor is the method limited to European languages, since this kind of information can be computed for any language, on any kind of corpora, where such corpora and basic linguistic tools such a dictionary lookup and word guessers are available. Moreover, this information can be computed globally (i.e., calculated once to be used for all documents) or adapted to different applications and corpora.

The sequence extraction component 48 operates on the sequences of words which are not recognized in the main language by recognition component 58, and determines whether each sequence should be expanded to append one or more words to the sequence, which may include words which are recognized in both a secondary language and the main language. The component 48 takes each secondary language in turn, in the order established by the language prioritizer 46, and for each sequence identified as having at least a first word which is recognized in that secondary language (e.g., in lexicon 56 by lookup component 42), unless that sequence has already been fully processed for a language of higher priority, determines whether the sequence should be expanded, on one or both ends of that first word, to incorporate additional words, such as words which are delimited together with the first word and/or which appear in the corresponding lexicon 56 for that language. In the exemplary method, it is only when there is at least one word not recognized in the main language that the sequence extraction component 48 considers that word or words as a candidate for expanding the sequence to additional words, using an algorithm as described in detail below.

The unknown sequence, as possibly expanded by the sequence extraction component 48, is labeled with tags 60 to indicate the beginning and end of the sequence and the determined language of the sequence. The extraction component 48 may also use the lookup component 42 and/or a morphological analyzer 52 for the second to attach parts of speech to those words, as identified in the appropriate lexicon 54 for the respective secondary language. Language. In general, a full parsing is not required or applied for the secondary language, thus a full parser need not be provided for the secondary languages. The sequence of words in the secondary language and their parts of speech may be stored in a temporary dictionary 62, e.g., in memory 24, for subsequent processing of the sentence in the main language by the natural language parser 50. In some embodiments, the parser 50 may be used to provide information for each sentence of the input text 14, which extends beyond the basic morphological analysis of the words themselves. Special rules may be provided in the parser 50 for handling secondary language sequences, and associating information with them, as described in greater detail below.

In general, the natural language parser 50 treats each sentence of the input text as a sequence of tokens and, during parsing of the document, annotates the text strings of the document with tags (labels) which correspond to grammar rules, such as lexical rules, syntactic rules, and dependency (semantic) rules. The lexical rules define relationships between words by the order in which they may occur or the spaces between them. Syntactic rules describe the grammatical relationships between the words, such as noun-verb, adjective-noun. Semantic rules include rules for extracting dependencies (subject-verb relationships, object-verb relationships, etc.), named entities, and co-reference links. In some embodiments, the parser 50 comprises an incremental parser, as described, for example, in above-mentioned U.S. Pat. No. 7,058,567 by Aït-Mokhtar, et al.; Aït-Mokhtar, et al., "Incremental Finite-State Parsing," Proceedings of Applied Natural Language Processing, Washington, April 1997; and Aït-Mokhtar, et al., "Subject and Object Dependency Extraction Using Finite-State Transducers," Proceedings ACL '97 Workshop on Information Extraction and the Building of Lexical Semantic Resources for NLP Applications, Madrid, July 1997. Further details on deep syntactic parsing which may be applied herein are provided in U.S. Pub. No. 2007/0179776, by Segond, et al. and U.S. Pub. No. 2009/0204596, by Brun et al., the disclosures of which are incorporated herein by reference, and in Aït-Mokhtar, et al., "Robustness beyond Shallowness: Incremental Dependency Parsing," Special issue of NLE journal (2002); and Ait-Mokhtar, et al. "Incremental Finite-State Parsing," Proceedings of Applied Natural Language Processing, Washington, April 1997. Such a parser may be modified to incorporate the rules described below for processing secondary language sequences.

The computer system 10 may comprise one or more general or specific-purpose computing devices, such as a PC, such as a desktop, a laptop, palmtop computer, portable digital assistant (PDA), a server computer, cellular telephone, pager, or other computing device capable of executing instructions for performing the exemplary method. In one embodiment, the source computer 28 may host the computer system 10.

The memory 22, 24 may represent any type of tangible computer readable medium such as random access memory (RAM), read only memory (ROM), magnetic disk or tape, optical disk, flash memory, holographic memory, or other non-transitory memory device. In one embodiment, the memory 22, 24 comprises a combination of random access memory and read only memory. In some embodiments, the processor 20 and memory 22 may be combined in a single chip.

The network interface(s) 26, 32 allow(s) the computer to communicate with other devices via a computer network, such as a local area network (LAN) or wide area network (WAN), or the internet, and may comprise a modulator/demodulator (MODEM).

The digital processor 20 can be variously embodied, such as by a single-core processor, a dual-core processor (or more generally by a multiple-core processor), a digital processor and cooperating math coprocessor, a digital controller, or the like. The exemplary digital processor 20, in addition to controlling the operation of the computer 10, executes instructions stored in memory 22 for performing the method outlined in FIGS. 2 and 3.

As will be appreciated, FIG. 1 is a high level functional block diagram of only a portion of the components which are incorporated into a computer system 10. Since the configuration and operation of programmable computers are well known, they will not be described further.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

FIG. 2 illustrates a method for processing a text sequence in a main language to identify sequences of words in one or more secondary language(s), where present. The method may be performed with the system of FIG. 1. The method begins at S100.

At S102, a document 12 to be processed is input to the computer system 10, or generated within the computer system, and stored in memory 24.

At S104, if the main language of the document is not yet identified, e.g., by user input or by tags on the document, the method proceeds to S106, where the main language is automatically identified, e.g., by the language guesser 40, which outputs the probable main language. Otherwise, the method proceeds directly to S108. For example, the main language may be identified by a user or identified from a label on the document, such as metadata or other tag, in which case, S106 is omitted.

At S108, the text 12 is analyzed by the lexicon lookup component 42, which accesses the main language lexicon 54 (dictionary lookup).

At S110, the sequences of words output from S108 that are unknown in the main language lexicon 54 are optionally processed with the word guesser 44 to provide a guessed morphological analysis. In some embodiments, this step may be left until later and, in one embodiment, is only performed if the word sequence is not recognized in any of the foreign languages tested. A list of unrecognized word sequences is output.

If at S112, more than one secondary language L' is to be applied, the method proceeds to S114, where the priority of secondary languages L' for analyzing the unrecognized sequences is established, otherwise the method may proceed directly to S116. In other embodiments, S112 may be omitted.

At S116, the sequences of unrecognized words are analyzed by the sequence extraction component 48 using the secondary languages in the order set at S114, and expanded with adjacent words determined to be in the same secondary language. Step S116 may proceed as shown in FIG. 3, as described in further detail below.

Optionally, at S118, the text may be parsed to identify syntactic and semantic relations between pairs of words (or word groups) in the text, including between a word(s) recognized in the main language and a word(s) recognized in a secondary language, using specialized parser rules.

At S120, the processed text 14' and/or its morphological and/or syntactic/semantic analysis is output, e.g., to a memory storage device, which is then searchable by a search engine using formulated queries based on searchers' input queries to retrieve text, or to a display device, printer, or other output device.

The method ends at S122.

Referring now to FIG. 3, S116 may proceed according to the following algorithm:

I. At S202 the unrecognized sequences are analyzed according to a first (highest priority) secondary language L' to identify a set of sequences S which each comprise at least a first word that is recognized in the first secondary language, e.g., based on the output of the lexicon lookup component 42 using the appropriate lexicon 56 for that language.

II. At S204, from the list of unrecognized sequences, for each sequence S in turn, in which at least a first word $W_1$ is recognized in L', sequences $S_{L'}$ of words potentially belonging to the secondary language L are selected as follows:

If at S206, the first word $W_1$ of the sequence S is introduced by a starting quote, a parenthesis, or other structural delimiter (emphasis, bold, italic, . . . ), etc: the sequence $S_{L'}$ starting with this word $W_1$ until the word $W_i$ followed by the corresponding closing quote, parenthesis, or other structural delimiter is selected. The sequence $S_{L'}$ is tagged with that language L' (S208). A check is made to determine if there are any more sequences S in which at least a first word $W_1$ is recognized in L' (S210), and if so, the method returns to S204.

If at S206, no structural delimiter is identified:

At S212, the method includes verifying if the word $W_2$ following $W_1$ is recognized in the secondary language L' (excluding punctuation marks):

A. If it is, $W_2$ is included in $S_{L'}$ along with $W_1$ (S214). The method then returns to S212, which is repeated for $W_3$ (the word following $W_2$), etc.

B. If not, this end of the sequence $S_{L'}$ is terminated (S216) and the method proceeds to S218.

C. A check is made to determine if the word $W_{-1}$ placed immediately before S is recognized in L' (this means that word $W_{-1}$ belongs to both L and L') (S218):

If yes at S218, $W_{-1}$ is inserted at the beginning of $S_{L'}$ (S220) and the method returns to S218 to repeat for $W_{-2}$ etc.

If no at S218, the sequence $S_{L'}$ is terminated (S222), and tagged as being a sequence in L'. A morphological analysis of the words in the sequence $S_i$: which is specific to the secondary language L' is provided by a morphological analyzer 52, e.g., by adding, for each word, one or more morphological tag(s) which are relevant to the language L' (S208). A check is made to determine if there are any more sequences S in which at least a first word $W_1$ is recognized in L' (S210), and if so the method returns to S204.

At S210, where there are at least two adjacent sequences in the same L' already identified (e.g., once all sequences in L' have been processed), the adjacent sequences, where present, for which the sequences are separated by a weak punctuation mark (e.g., comma, dash, or semi-colon, but not a period, exclamation or question marks, which are sentence boundaries) may be grouped as a single sequence in L' and tagged accordingly (S224).

III. At S226, when there are no more sequences in L' to be processed, if there are remaining sequences of words yet to be recognized and if there are more secondary languages (S228), the method returns to S202, using the other secondary language(s) (L'', L''', . . . ) which are in the prioritization list for the remaining sequences of unknown words that have not be selected for L'. Otherwise the method proceeds to S230.

IV. At S230, if there are any sequences S of unrecognized words that have not been recognized in any of the selected languages, these may be labeled as unknown words in L and labeled with morphological tags output by the word guesser 44. The method then proceeds to S118 (optional) or to S120.

In some embodiments, even if delimiters, such as quotes are used, these may not signify that the entire text in quotes is in the same language. Thus, in some embodiments, S208 may be omitted. In other embodiments, the text in quotes or otherwise delimited may be further processed to ensure that each word is found in the secondary language.

To illustrate the detection algorithm on some examples consider the following:

EXAMPLE 1

From a French Newspaper

Un an après, les obamaniaques, nombreux en France, ceux qui avaient cru que leur nouveau héros, Barack, allait tout casser, ne peuvent masquer leur deception. Le "Yes we can" du candidat est devenu le "No we didn't" du président ("non, nous ne l'avons pas fait"). On sent chez les fans une profonde desillusion.

In this example, the presence of quotes is helpful to detect sequences of words (see FIG. 3, S206 of the algorithm):

Step 1, at S104 or S106, main language L=French (either known or guessed by a language guesser 40) is determined.

Step 2, at S110: three sequences of unrecognized words=[obamaniaques, yes we can, No we didn't] are identified by the recognition component 58.

Step 3, at S202: analysis of the 3 sequences with L'=English gives the following morphological analysis (word, root form, morphology) and, where ambiguous, each stored morphology:

| | | |
|---|---|---|
| 1. obamaniaques | | Guess+pI+NADJ//not recognized |
| 2. yes | yes | Noun+countable+Sg+NOUN |
| yes | yes | Verb+Pres+Non3sg+VERB |
| yes | yes | Adv+notly+ADV |
| we | we | Pron+Pers+Nom+1P+PI+PRONPERS |
| can | can | Verb+Trans+Pres+Non3sg+VERB |
| can | can | Noun+countable+Sg+NOUN |
| can | can | +Aux+VAUX |
| 3. no | no | +Noun+Sg+NOUN |
| no | no | +Adv+notly+ADV |
| no | no | +0+2+Quant+QUANT |
| we | we | +3+5+Pron+Pers+Nom+1P+PI+PRONPERS |
| didn't | do | +Verb+a_vcreation+s_sc_pwithout+s_sc_pwith+s_sc_pas+s_sc_pabout+PastTense+123SP=not+Adv+VDPAST |

Step 4, at S206, as "yes" and "no" are English words introduced by a quote, at S208, return the complete sequences [yes we can, no we didn't] as English sequences.

Step 5, since there are more sequences (S226): analyze any remaining sequences with morphological analyzers for alternative languages (S202):

| | | |
|---|---|---|
| L"=German: not recognized | | |
| obamaniaques | obamaniaquesen | +Verb+Imp+2P+Sg+guessed |
| obamaniaques | obamaniaques | +Adj+Invar+guessed |
| obamaniaques | obamaniaques | +Adv+guessed |
| L'" = Spanish: not recognized | | |
| obamaniaques | obamaniaques | +Noun+MF+SP+guessed+hmm__NOUN |
| obamaniaques | obamaniaques | +Adj+MF+SP+guessed+hmm__ADJSG |
| obamaniaques | obamaniaques | +Adv+guessed+hmm__ADV |
| obamaniaques | obamaniaques | +Prop+guessed+hmm__PROP |

Accordingly, the word <<obamaniaques>> remains a French unknown word.

EXAMPLE 2

Bienvenue à tous dans les Charts du Vendredi, avec le classement made in Japan des meilleures ventes de jeux et de consoles sur le sol nippon pour la période du 15 au 21 février derniers . . . La PSP n'est qu'un brin au dessus de sa grande sœur aussi, tandis que la DS tient toujours tout le monde éloigné, of course . . . .

Step 1: main language L=French

Step 2: sequences of unrecognized words=[Charts, made, Japan, PSP, DS, of]. Note that in and course are known in the French dictionary (ambiguity between languages) so are not classed as unrecognized at S110.

Step 3: analysis of the 6 sequences with L'=English:

| | | | |
|---|---|---|---|
| 1. | Charts | chart | Verb+Trans+Pres+3sg+VERB |
| | Charts | chart | Noun+countable+PI+NOUN |
| 2. | made | make | +Verb+PastBoth+123SP+VPAST |
| | made | make | +PastBoth+123SP+VPAP |
| | made | made | +Adj+VPap+ADJPAP |
| 3. | Japan | Japan | +Prop+Place+Country+NOUN |
| 4. | PSP | PSP | +Guess+Noun+Prop+NOUN//not recognized |
| 5. | DS | DS | +Guess+Noun+Prop+NOUN//not recognized |
| 6. | of | of | +Prep+PREP |

The sequences recognized as belonging to L' at S202 are thus [Charts, made, Japan, of]. PSP and DS are not recognized in L'.

Step 4 (no quotes in this example):

For the sequence Charts: du placed after this word and also les placed before it are not recognized in the English vocabulary: the sequence is thus limited to Charts, and is labeled as English.

For the sequence made: in and then Japan placed after this word belong to the English vocabulary, but des placed after Japan and classement placed before made do not. The expanded sequence is thus made in Japan, and is labeled as English.

For of, (as Japan has been treated): course is recognized in English and is added to the sequence. There is a comma before of, so this sequence is terminated (note that it could have been combined with another English sequence at S224, if one had been identified immediately preceding the comma, but this is not the case here): the sequence is of course, and is labeled as English.

The sequences detected in English are therefore [Charts, made in Japan, of course].

Step 5: analyze remaining sequences with alternative languages. As both PSP and DS are not recognized in German and Spanish, they remain French unknown words.

While the output produced by the exemplary algorithm may be useful for many applications, such as grammar correction and spell checking, the method may be used to go beyond secondary language detection by integrating this information within a parsing process. As will be appreciated, the extracted sequences may be considered to behave linguistically as lexical units, except in the case of quotations. By integrating them as lexical units together with the appropriate part of speech, this can greatly improve further syntactic analysis (S118). To perform this task, the lexical results obtained during the detection algorithm, which provides morphological information about the part of speech of the foreign words, can be used. Moreover, a study of such foreign language insertions shows that they correspond to saturated linguistic units and therefore do not belong to closed categories, such a determiner or preposition, but to the main syntactic categories: mainly nouns but also adjectives, verbs and adverbs.

For handling these secondary language sequences, the following two rules are contemplated:

1. For a single word: it may simply be integrated in the temporary dictionary 62 with its ambiguity class (e.g., noun, verb, adjective, adverb or combination thereof), as output by the morphological analyzer 52 for its recognized language.

2. For a sequence of two or more words: the sequence may be integrated in the temporary dictionary 62 as a multiword unit, according to the following heuristic:

a) A sequence of purely nominal or adjectival words terminated by a word of the same or another ambiguity class take the ambiguity class of the last word (e.g., in "money sink", sink has the ambiguity class verb or noun, so the sequence is given the ambiguity class verb and noun).

b) A sequence starting with a preposition is integrated as an adverb or an adjective (equivalent to a prepositional phrase (PP) in terms of syntactic distribution). For example, the sequence "with the boy" is denoted as an adjective.

ary language insertions. Given Example 2, above, the corresponding temporary lexicon 62 stores the following information:

```
"Charts" += noun[noun=+,English=+]. // Charts can be noun or verb
"Charts" += verb[verb=+,English=+].
"made in Japan" += noun[noun=+,English=+]. //fully ambiguous
"made in Japan" += verb[verb=+,English=+].
"made in Japan" += adj[adj=+,English=+].
"made in Japan" += adv[adv=+,English=+].
"of course" += adj[adj=+,English=+]. // starts with a prep → adj or adv
"of course" += adv[adv=+,English=+].
```

Applying the standard French grammar including this dictionary 62 gives the following results on parsing:

```
1>GROUPE{NP{Bienvenue} PP{à NP{tous}} PP{dans NP{les Charts}} PP{du
NP{Vendredi}} , PP{avec NP{le classement}} AP{made in Japan} PP{des
NP{AP{meilleures} ventes}} PP{de NP{jeux}} et PP{de NP{consoles}} PP{sur
NP{le sol}} AP{nippon} PP{pour NP{la période}} ADV_INTERVAL:+{du 15 au
NOUN{21 février derniers}} .}
NMOD_POSIT1(classement,made in Japan)
NMOD_POSIT1(sol,nippon)
NMOD_POSIT1(ventes,meilleures)
NMOD_POSIT1(Bienvenue,tous)
NMOD_POSIT1(tous,Charts)
NMOD_POSIT1(Charts,Vendredi)
NMOD_POSIT1(consoles,sol)
NMOD_POSIT1(sol,période)
NMOD_POSIT1(ventes,jeux)
NMOD_POSIT1(classement,ventes)
PRECOMMA(classement)
AGEO(nippon,Japon)
DETD(Charts,les)
DATE_RELATIVE(du Vendredi)
DATE_RELATIVE(du 15 au 21 février derniers)
HEADTEMP(Vendredi,du Vendredi)
HEADTEMP(du 15 au 21 février derniers,du 15 au 21 février derniers)
2> GROUPE{SC{NP{La PSP} FV{n' est}} qu' NP{un brin} PP{au NP{dessus}}
PP{de NP{sa AP{grande_NONDATE:+} soeur}} aussi , SC{BG{tandis que} NP{la
DS} FV{tient}} toujours NP{tout le monde} AP{éloigné} , ADV{of course}.}
SUBJ(est,PSP)
SUBJ(tient,DS)
OBJ(tient,tout le monde)
OBJ_SPRED(est,brin)
VMOD_POSIT1(est,aussi)
VMOD_POSIT1(tient,toujours)
VMOD_POSIT1(tient,of course)
VMOD_POSIT1_SUBORD(est,tient)
VMOD(est,qu')
NMOD_POSIT1(tout le monde,éloigné)
NMOD_POSIT1(soeur,grande_NONDATE:+)
NMOD_POSIT1(brin,dessus)
NMOD_POSIT1(dessus,soeur)
CONNECT(tient,tandis que)
NEGAT(est)
PRECOMMA(tient)
0>GROUPE{SC{NP{La PSP} FV{n' est}} qu' NP{un brin} PP{au NP{dessus}}
PP{de NP{sa AP{grande_NONDATE:+} soeur}} aussi , SC{BG{tandis que} NP{la
DS} FV{tient}} toujours NP{tout le monde} AP{éloigné} , ADV{of course} .}
``` c) Other kinds of sequences not complying with a) or b) are integrated with the full ambiguity class selected from noun, adjective, verb and adverb, and combinations thereof. See the case of "full stuff gold" in the example below.

Then, further syntactic processing can apply regularly, in accordance with the parser rules.

In the exemplary embodiment, these rules applied in S118 are implemented by the parser by building, during the operation of the detection algorithm (S116), one or more temporary dictionaries 62 that encode this information about the second- In the above exemplary parser outputs, the abbreviations denoting the syntactic relations, such as SUBJ, OBJ, etc., are for or between the word(s) following in parenthesis. NMOD for example means a modifier. POSIT1 indicates that the modifier is the first one to appear on the right of the modified element, POSIT2 would indicates that the modifier is the second to appear on the right of the modified element, etc. DETD indicates a determiner. The English expressions have been correctly tagged (illustrated in bold), and consequently the syntactic chunks and dependencies are correctly extracted.

As noted above, the exemplary system and method are able to handle sequences of secondary language words inserted within a document written in a default language. While employing existing technologies (lexical lookup and unknown word guessing), it goes beyond these tools. Moreover the processing of these expressions within a natural language parsing application is also advantageous.

The exemplary system and method are able to improve a variety of NLP-based applications, which are language-dependent. As examples:

1. Information extraction: as has been demonstrated, the result of a parser is improved, which can lead to improved information extraction. In particular, the use of secondary language insertions is quite frequent in media such as blogs, forums, and review sites. These are often the focus of opinion mining applications. Opinion mining is of great interest to research organizations and businesses, for example, to evaluate whether comments are favorable towards particular products, services, or the like. Information technologies can be used to seek out and understand the opinions of others, and the exemplary embodiments may be integrated in such applications. For example, an information system may include the system of FIG. 1 and apply the method of FIGS. 2 and 3 as a preprocessing step. An opinion mining system comprising the system may include a component for processing the output of the system to identify an opinion of a person to whom the text is attributable. Opinion mining systems which may be used are disclosed, for example, in above-referenced U.S. Pub. Nos. 2004/0158454 and 2009/0265304.

2. Automatic translation: the exemplary system and method enable translation systems to avoid translation of parts of a source text which are already in the target language, and can also be used to trigger the appropriate processing for other secondary languages identified in the source document. For example, a translation system may include the system of FIG. 1 and apply the method of FIGS. 2 and 3 as a preprocessing step prior to translation of the text.

3. Automatic grammar correction and spell-checking: the system may be used to associate automatically the appropriate lexicons and grammars to secondary languages insertions and thus avoid having inappropriate or unwanted correction proposals.

The method illustrated in FIGS. 2 and 3 may be implemented in a non-transitory computer program product that may be executed on a computer. The computer program product may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and 3, can be used to implement the method for identifying secondary language sequences in text.

Without intending to limit the scope of the exemplary embodiment, the following evaluation demonstrates the effectiveness of the exemplary method.

Evaluation

As the use of secondary languages, in particular English, is particularly fashionable within blogs and forums, an evaluation was performed on sample texts extracted from blogs about games. These kinds of corpora are often the focus of opinion mining applications which attempt to determine the author's opinion using natural language processing of the text.

As a simplified prototype, a system that detects English sequences within French texts was developed. The corpus is made of about 30 comments about video games (a total of 6232 words). Here is an example output of this prototype, where XML tags are used to denote the start and end of each English language sequence:

```
<text mainLang= French>
Les   <english>gold   farmers</english>   sont   une
conséquence d'un mauvais design: le <english>money
sink</english> est beaucoup trop élevé, tout le
monde en a marre de devoir payer tout temps pour
tout et n'importe quoi, et trop cher.
   Le <english>craft </english> basé sur la chance
est une catastrophe pure est simple qui doit être
corrigée.
Les flux d'armes nécessaires pour les quêtes
expert de 3 métiers, c'est encore une énorme
erreur de design très pénible pour les joueurs.
   Le <english>stuff</english> a beaucoup trop
d'importance et gache grandement le PvP.
Les joueurs <english>full stuff gold </english> 50
peuvent être considérés comme des joueurs de
<english>level</english>    60     vu     leurs
<english>stats</english>,    ce    qui    rend    les
rencontres sans intérêt.
</text>
```

If the output were extended to parsing, the multiword expression gold+noun farmers+noun may be integrated as a noun and money+noun sink+noun_or_verb can be integrated as a noun or a verb, according to the heuristic described above in S118.

The exemplary algorithm was evaluated in terms of English words detected, but also in terms of sequences of English words detected (a sequence is considered wrong if one word within the sequence is wrong). Table 2 shows the results obtained in terms of precision, recall, and f-measure. Precision is the number of correct English words/sequences detected divided by the total number of English words/sequences detected. Recall is the number of correct English words/sequences detected divided by the total number of English words/sequences tagged in the reference. The f-measure is the harmonic mean of precision and recall.

TABLE 2

|  | number of words | precision | recall | f-measure |
|---|---|---|---|---|
| English words detected | 447 | 0.98 | 0.95 | 0.96 |
| English sequences of words detected | 243 | 0.96 | 0.90 | 0.93 |

The detection algorithm provides useful results in that it enables secondary language words and sequences to be identified to a degree which is not possible with conventional language guessers.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for processing text, comprising:
   receiving text to be processed;
   identifying a main language of the text;
   identifying at least one unrecognized sequence in the text, each unrecognized sequence comprising at least one word that is unrecognized in the main language;
   establishing an order of priority for a plurality of secondary languages such that unrecognized sequences are processed for the secondary languages in the order of their priority, whereby unrecognized sequences identified as being in a first of the secondary languages are removed from the set of unrecognized sequences before processing with a second of the secondary languages with lower priority;
   for a first of the secondary languages and for each of the at least one unrecognized sequence, determining whether the unrecognized sequence includes a first word recognized in the secondary language and, if so, identifying a sequence of words in the secondary language which includes at least the first word, the identifying of the sequence of words in the secondary language including determining whether the sequence of words in the secondary language should be expanded beyond the first word to include adjacent words, otherwise processing with the second of the secondary languages with lower priority; and
   labeling the text based on the identified sequences of words in the secondary language; and
   wherein at least one of the identifying of the main language, the identifying of the unrecognized sequence, and the identifying a sequence of words in the secondary language is performed with a computer processor.

2. The method of claim 1, wherein the identifying the main language comprises processing the text with a language guesser.

3. The method of claim 1, wherein the determining whether the sequence should be expanded beyond the first word to include adjacent words comprises providing for at least one of:
   a) determining whether the first word is part of a sequence of delimited text and if so, including in the sequence of words in the secondary language other words in the sequence of delimited text, and
   b) determining whether at least one word preceding the first word is recognized in the secondary language and if so, adding it to the sequence of words in the secondary language.

4. The method of claim 3, wherein the delimited text is delimited by at least one of emphasis and quotation marks.

5. The method of claim 3, wherein b) further includes verifying whether at least one word following the first word in the text is recognized in the secondary language and if so, adding it to the sequence of words in the secondary language.

6. The method of claim 3, wherein the method includes a) and when the at least a first word of the unrecognized sequence is not identified as being in delimited text in a), the method proceeds to b).

7. The method of claim 1, wherein the identifying at least one unrecognized sequence in the text includes providing for identifying words of the text that are not represented in a lexicon for the main language.

8. The method of claim 1, wherein the
   determining whether the unrecognized sequence includes a first word recognized in the secondary language includes accessing a lexicon for the secondary language with at least the first word of the unrecognized sequence and automatically recognizing the word in the second language if it is present in the lexicon for the secondary language.

9. The method of claim 1, wherein the secondary language comprises a first secondary language and at least a second secondary language, the method further comprising, for each of the at least one unrecognized sequence not recognized as being in the first secondary language, determining whether the unrecognized sequence includes a first word recognized in the second secondary language and, if so, identifying a sequence of words in the second secondary language which includes at least the first word, the identifying of the sequence of words in the second secondary language including determining whether the sequence in the second secondary language should be expanded beyond the first word to include adjacent words and labeling the text based on the identified sequences of words in the second secondary language.

10. The method of claim 9, wherein the first secondary language is one which is established as being used more frequently in documents in the main language than the second secondary language.

11. The method of claim 1, further comprising, where two sequences identified as being in a same secondary language are separated only by soft punctuation, combining the two sequences.

12. A method of spell checking comprising:
    performing the method of claim 1 to identify sequences of words in at least one secondary language; and
    processing the identified sequences differently with a spell checker from words of the main language.

13. A translation method comprising:
    performing the method of claim 1 to identify sequences of words in at least one secondary language; and
    processing the identified sequences differently with a machine translation system from words of the main language.

14. The method of claim 1, wherein the method further includes associating morphological information with the identified sequences of words in the secondary language.

15. The method of claim 14, further comprising natural language parsing the input text which takes into account the morphological information associated with the identified sequences in the secondary language.

16. The method of claim 15, wherein the associating morphological information comprises applying grouping rules for grouping words of a sequence of at least two words recognized in the second language under a common morphological class, based on morphological classes assigned to the words, the grouping rules differing from parsing rules which are applied to sequences words recognized in the main language in those morphological classes during the natural language parsing.

17. A method for querying text comprising:
   receiving a user's query; and
   with a computer processor, querying text which has been processed by the method of claim 14 to retrieve responsive text.

18. A non-transitory computer program product comprising tangible media encoding instructions which when executed by a processor, perform the method of claim 1.

19. A text processing system comprising non-transitory memory which stores instructions for performing the method of claim 1 and a processor in communication with the memory for executing the instructions.

20. A system for processing text, comprising:
   an input for receiving text to be processed;
   optionally, a language guesser for identifying a main language of the text if it has not been otherwise identified;
   a recognition component which identifies whether there is at least one unrecognized sequence in the text, each unrecognized sequence comprising at least one word that is unrecognized in the main language;
   a sequence extraction component which, for each of a plurality of secondary languages in a determined order of priority, determines whether at least one of the unrecognized sequences includes a first word recognized in a respective secondary language and, if so, identifies a sequence of words in the respective secondary language which includes at least the first word by providing rules for expanding the sequence beyond the first word with additional words that are determined to be in the respective second language, wherein an unrecognized sequence which has been determined to be in a second language with a higher priority is not considered by the sequence extraction for a second language with a lower priority, and otherwise, labels as unknown any word sequences unrecognized in the secondary languages; and
   a processor which implements at least one of the language guesser, recognition component and the sequence extraction component.

21. The system of claim 20, further comprising a syntactic parser for outputting syntactic relations between words in the main language and words in a respective secondary language.

22. The system of claim 21, further comprising memory which stores words of an identified sequence in a secondary language in a temporary dictionary for processing with the syntactic parser.

23. The system of claim 20, further comprising lexicons for respective ones of the main language and plurality of secondary languages, the recognition component comprising a lexicon lookup component which accesses the lexicon of at least one secondary language with at least one unrecognized word of an unrecognized sequence in the main language.

24. An opinion mining system comprising the system of claim 20 and a component for processing the output of the system to identify an opinion of a person to whom the text is attributable.

25. A method for identifying word sequences in at least one secondary language within text in a main language, comprising:
   identifying at least one unrecognized sequence in the text, each unrecognized sequence comprising at least one word that is unrecognized in the main language;
   with, for each of a plurality of secondary languages in a determined order of priority, determining with whether at least one of the at least one unrecognized sequences includes a first word recognized in a respective one of the plurality of secondary languages and, if so, implementing an algorithm for identifying a sequence of words in the respective secondary language which includes at least the first word by extending the sequence beyond the first word with additional words that are determined to be in the respective second language, wherein an unrecognized sequence which has been determined to be in a sequence of words in a respective secondary language with a higher priority is not considered by the sequence extraction for a second language with a lower priority, and, if the unrecognized sequence does not include a first word recognized in any of the plurality of secondary languages, labels the unrecognized sequence as being unknown; and
   labeling the identified sequences based on the respective secondary languages.

26. The system of claim 20 comprising the language guesser for identifying the main language of the text.

* * * * *